United States Patent
Mainguet et al.

(10) Patent No.: US 8,801,274 B2
(45) Date of Patent: Aug. 12, 2014

(54) TIME-RELATED TEMPERATURE VARIATION TRANSDUCER, ELECTRONIC CHIP INCORPORATING THIS TRANSDUCER AND METHOD OF FABRICATION OF THIS CHIP

(75) Inventors: Jean-Francois Mainguet, Grenoble (FR); Alain Chambron, Saint-Egreve (FR); Bruno Charrat, Saint-Egreve (FR); Emmanuel Defay, Voreppe (FR); Guy-Michel Parat, Claix (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 412 days.

(21) Appl. No.: 13/101,478

(22) Filed: May 5, 2011

(65) Prior Publication Data

US 2011/0280276 A1    Nov. 17, 2011

(30) Foreign Application Priority Data

May 6, 2010   (FR) ..................... 10 53554

(51) Int. Cl.
*G01K 3/04* (2006.01)
*G01K 7/00* (2006.01)
*G01J 5/10* (2006.01)

(52) U.S. Cl.
USPC ........... 374/102; 374/183; 374/121; 374/178; 250/467; 438/54

(58) Field of Classification Search
CPC ............. H01L 29/2003; H01L 29/66734; H01L 21/02458; H01L 21/0254; B82Y 20/00; B82Y 10/00

USPC ......... 374/120, 121, 100–109, 183, 178, 185; 438/54, 57; 338/22 R, 25, 28
See application file for complete search history.

(56) References Cited

U.S. PATENT DOCUMENTS

| 3,046,786 A | * | 7/1962 | Tessem ........................ 204/407 |
| 3,336,212 A | * | 8/1967 | Nicholas et al. .............. 374/102 |
| 3,604,933 A | * | 9/1971 | Cross et al. ................. 250/336.1 |
| 3,801,949 A | * | 4/1974 | Larrabee ..................... 338/22 R |
| 3,872,318 A | * | 3/1975 | Murayama .................... 307/400 |
| 4,024,560 A | * | 5/1977 | Miller et al. .................. 257/252 |

(Continued)

FOREIGN PATENT DOCUMENTS

| DE | 19634849 | 3/1998 |
| EP | 0825831 | 4/1998 |

(Continued)

OTHER PUBLICATIONS

Jacob Fraden "Pyroelectric Thermometers" The Measurement, Instrumentation, and Sensors Handbook, pp. 32-109 to 32-117 (1999).

*Primary Examiner* — Gail Verbitsky
(74) *Attorney, Agent, or Firm* — Occhiuti & Rohlicek LLP (57) ABSTRACT

A transducer for transducing time-related temperature variations into a difference in potentials includes an upper conductive electrode designed to be exposed to a time-related temperature variation to be measured, a lower conductive electrode, and at least one layer of pyroelectric material based on a III-V nitride directly interposed between the upper and lower conductive electrodes to generate, between the upper and lower conductive electrodes, a difference in potentials corresponding to the temperature variation even in the absence of external mechanical stress.

13 Claims, 2 Drawing Sheets

(56) References Cited

U.S. PATENT DOCUMENTS

| | | | |
|---|---|---|---|
| 4,394,773 A | | 7/1983 | Ruell |
| 4,429,413 A | | 1/1984 | Edwards |
| 4,631,406 A | * | 12/1986 | Nakata .................. 250/338.3 |
| 5,019,760 A | * | 5/1991 | Chu et al. .................. 318/490 |
| 5,403,752 A | * | 4/1995 | Bruchhaus et al. ............ 438/54 |
| 5,446,334 A | * | 8/1995 | Gaffney .................. 310/338 |
| 5,654,580 A | * | 8/1997 | Beratan et al. .............. 257/467 |
| 5,672,903 A | * | 9/1997 | Butler et al. ............... 257/467 |
| 5,975,758 A | * | 11/1999 | Yokota et al. .............. 374/185 |
| 5,995,359 A | * | 11/1999 | Klee et al. ................. 361/305 |
| 6,091,837 A | | 7/2000 | Dinh |
| 6,275,779 B1 | * | 8/2001 | Pohle et al. ................ 702/130 |
| 6,289,114 B1 | | 9/2001 | Mainguet |
| 6,326,621 B1 | * | 12/2001 | Kamada et al. ........... 250/338.2 |
| 6,563,118 B2 | * | 5/2003 | Ooms et al. ............... 250/338.3 |
| 7,032,454 B2 | | 4/2006 | Amano |
| 7,173,286 B2 | * | 2/2007 | Doolittle .................... 257/78 |
| 7,775,707 B2 | * | 8/2010 | Thommen et al. .......... 374/102 |
| 7,878,707 B2 | * | 2/2011 | Jensen ...................... 374/142 |
| 8,053,755 B2 | * | 11/2011 | Odnoblyudov et al. ........ 257/13 |
| 8,362,492 B2 | * | 1/2013 | Wort et al. .................. 257/77 |
| 2005/0116812 A1 | * | 6/2005 | Schmidt et al. ............. 340/10.1 |
| 2005/0193823 A1 | | 9/2005 | Amano |
| 2006/0108528 A1 | | 5/2006 | Qiu |
| 2008/0121927 A1 | | 5/2008 | Matocha et al. |
| 2008/0220727 A1 | * | 9/2008 | Albsmeier et al. ............. 455/73 |
| 2008/0283818 A1 | * | 11/2008 | Odnoblyudov et al. ........ 257/13 |
| 2010/0078753 A1 | * | 4/2010 | Mehregany et al. .......... 257/467 |
| 2010/0296545 A1 | * | 11/2010 | Haarer et al. ................ 374/102 |
| 2011/0203647 A1 | * | 8/2011 | Kumar ........................ 136/255 |
| 2012/0056504 A1 | * | 3/2012 | Hunter et al. ................ 310/306 |

FOREIGN PATENT DOCUMENTS

| | | |
|---|---|---|
| EP | 0840250 A1 | 5/1998 |
| EP | 0923341 B1 | 2/2002 |
| FR | 2736179 | 1/1997 |
| JP | 57092310 A * | 6/1982 |
| JP | 2003235993 A * | 8/2003 |
| WO | WO 0168271 A1 * | 9/2001 |

* cited by examiner

TIME-RELATED TEMPERATURE VARIATION TRANSDUCER, ELECTRONIC CHIP INCORPORATING THIS TRANSDUCER AND METHOD OF FABRICATION OF THIS CHIP

CROSS REFERENCE TO RELATED APPLICATION

This application claims the benefit of the May 6, 2010 priority date of French application 1053554. The contents of the foregoing application are incorporated herein by reference.

BACKGROUND OF THE INVENTION

1. Field of the Invention

The invention pertains to a transducer of time-related temperature variations into a difference in potentials. The invention also pertains to an electronic chip for detecting a heat pattern incorporating this transducer as well as to a method for fabricating this chip.

Typically, an electronic chip is made by a method of microelectronic fabrication, i.e. by the deposition of successive layers on the substrate and by the etching of certain of these layers, for example by photolithography.

2. Description of the Prior Art

Prior-art transducers comprise:

an upper conductive electrode designed to be exposed to the time-related temperature variation to be measured,
a lower conductive electrode,
at least one layer of pyroelectric material directly interposed between these electrodes to generate, between these electrodes, the difference in potentials corresponding to the temperature variation even when there is no external mechanical stress.

For example, a transducer of this kind is disclosed in the U.S. Pat. No. 4,429,413 in the context of a fingerprint detector.

An external mechanical stress is a mechanical stress applied to the upper electrode by a movable object external to the transducer.

It is important that the pyroelectric material used should have a pyroelectric coefficient that is as high as possible. The term "pyroelectric coefficient" herein designates the ratio defined by the following relationship: $\gamma=\Delta P/\Delta T$, where:

$\Delta T$ is the temperature variation, and
$\Delta P$ is the difference in potentials obtained in response to the temperature variation $\Delta T$.

The coefficient $\gamma$ must be high because the temperature variations to be detected are very low, i.e. below 1° C. and preferably 0.1° C. Furthermore, the heat exchange surface area between the transducer and the object applied to this transducer is often very small, i.e. less than 1 mm² and typically less than 5000 or 3000 µm². It is therefore necessary to use a pyroelectric material that can give the greatest possible difference in potentials in response to these low temperature variations in order to amplify the signal.

Prior-art transducers are therefore made uniquely with pyroelectric materials that have a high pyroelectric coefficient, i.e. a coefficient greater 20 µC/m²/K. For example, the pyroelectric materials used are:

a) polymers such as polyvinyldifluoride (PVDF) for which the pyroelectric coefficient is of the order of 40 µC/m²/k,
b) ceramics such as the ceramic known by the acronym LZT (lead zirconate titanate) for which the pyroelectric coefficient is about 350 µC/m²/K, or
c) crystals such as those known by the acronym TOTS (Triglycine SDF) or LiTaO₃ crystals.

It is also desirable that the size of the transducer should be as small as possible to increase its spatial resolution. For example, the sensitive face of the transducer should be smaller than 1 mm² and preferably smaller than 0.5 or 0.3 mm².

The sensitive face of the transducer is the face of this transducer through which the temperature variation to be converted into a difference in potential is picked up.

Because of its small dimensions, the transducer must preferably be fabricated by methods of microelectronic fabrication, i.e. the same collective fabrication methods as those used to fabricate the electronic chips used to make computers or the like. For example, these collective fabrication methods use the deposition and etching of layers stacked one upon the other on a substrate. Typically, the substrate is a wafer made of silicon or glass.

The prior art pyroelectric materials having a high pyroelectric coefficient are difficult to use in microelectronic fabrication methods.

For example, the polymer PVDF must be polarized after deposition with a voltage of some hundreds of volts and once polarized the other fabrication operations must be performed at temperatures inferior to 120° C. so that this polymer PVDF does not lose its pyroelectric properties.

Ceramics require high fabrication temperatures, i.e. temperatures of over 600° C. and therefore far higher than a temperature of 400 to 450° C. generally given as the upper limit for implementing a method of microelectronic fabrication. Thus, the prior-art transducers are difficult to fabricate

SUMMARY OF THE INVENTION

The invention is therefore aimed at proposing a transducer that is easier to fabricate with microelectronic fabrication methods. An object of the invention therefore is a transducer of time-related temperature variations in which the pyroelectric material is based on III-V nitride.

The term "based on III-V nitride" is used to designate a layer of pyroelectric material comprising at least 10% by mass and preferably at least 25, 50 or 75% by mass of a nitride or a mixture of III-V nitrides.

A III-V nitride is a nitride belonging to the group of composite semiconductor elements fabricated out of one or more elements from column 3 of the periodic table of elements (aluminum, gallium etc) and one or more elements from column 5 (nitrogen, phosphorous, arsenic, antimony etc). The III-V nitrides include especially aluminum nitride, gallium nitride and indium nitride.

The pyroelectric properties of the III-V nitrides are known. However, they have not been hitherto used to form the layer of pyroelectric material of a transducer because of their low pyroelectric coefficient which is below 6 or 8 µC/m²/K.

More specifically, in practice when a III-V nitride such as aluminum nitride is used to make a transducer, it is its piezoelectric properties that are used and the transducers thus made are therefore pressure transducers and not temperature transducers (see for example the U.S. Pat. No. 7,032,454). To exploit the piezoelectric properties of aluminum nitride, spaces must be provided to enable the aluminum nitride to get deformed.

However, this low pyroelectric coefficient is compensated for by low dielectric permittivity of the order of 10. Indeed, the low dielectric constant of III-V nitrides gives a major difference in potentials between the upper and lower electrodes, thus increasing its sensitivity. This increase in sensitivity related to its low dielectric constant at least partly compensates for the loss in sensitivity caused by its low pyroelectric coefficient. Thus, a III-V nitride enables the building of a time-related temperature variation transducer with a sensitivity close to the one obtained with another pyroelectric material having far higher pyroelectric coefficients.

Furthermore, the III-V nitrides have the advantage of being very easy to implement by means of microelectronic fabrication methods. This advantage is present in the particular case of aluminum nitride (AlN) but is also found with other III-V nitrides. For example, aluminum nitride does not need to be polarized by a difference in potentials to show pyroelectric properties as is the case with PVDF polymers. The pyroelectric effects of the aluminum nitride layer are therefore active and measurable as soon as it is deposited on a substrate. It is then possible to test the efficient working of this aluminum nitride layer far more quickly than with the fabrication method and therefore to detect any possible anomalies or malfunctions.

Aluminum nitride does not have any Curie temperature or Curie point beyond which it loses its pyroelectric properties. The operations that follow the deposition of the aluminum nitride layer such as for example operations of soldering or depositing additional layers are therefore not restricted by the temperature of the aluminum nitride as is the case with the other pyroelectric materials such as the PVDF polymer whose Curie temperature is of the order of 125° C.

This transducer which uses a layer based on a III-V nitride such as a pyroelectric material therefore shows performance characteristics close to those of transducers using materials with a high pyroelectric coefficient while at the same time being far simpler to fabricate by microelectronic fabrication methods.

The embodiments of this transducer may therefore have one or more of the following characteristics:
  the pyroelectric material is based on aluminum nitride;
  the upper electrode is made out of molybdenum or titanium;
  the upper electrode is made out of a conductive metal of which only the upper face opposite the face in contact with the layer made of pyroelectric material is oxidized so as to modify its color as compared with the case in which this upper electrode is not oxidized;
  the transducer has a substrate on which at least the lower layer, the pyroelectric layer and then upper electrode are stacked.

These embodiments of this transducer furthermore have the following advantages:
  the fact of making the upper electrode out of molybdenum (Mo) or titanium (Ti) improves the protection of the transducer because molybdenum and titanium are materials highly resistant to abrasion and chemical corrosion,
  the fact of oxidizing the upper electrode enables the sensitive face of the transducer to be colored in a simple way without resorting to varnish or to color paint liable to thermally insulate the transducer.

An object of the invention is also an electronic chip for the detection of heat patterns, the chip comprising:
  at least the above transducer of time-related temperature variations into a difference in potentials,
  at least one resistor taking the form of a resistive band etched in a same layer as the lower electrode and/or upper electrode of the transducer to heat the pyroelectric layer of this transducer when it is crossed by a current, the resistive band going through this electrode so as to divide it into at least two separate plates, and
  electrical pins used to electrically short-circuit the separated plates above/below the plane of the layer in which the resistive band is formed.

The fact of using a resistive band that divides the electrode into several plates separated from one another simplifies the making of the heating resistor while at the same time minimizing the surface area occupied by this resistive band in this transducer. This also enables the heat within the transducer to be distributed more uniformly.

The embodiments of this chip may comprise the following characteristics:
  the chip comprises a network of transducers arranged beside one another to form a sensitive face on which an object having the heat pattern to be detected rests, and
  the upper or lower electrode of each transducer has a surface area of at least 0.5 mm$^2$ and the center of this electrode is separated from the center of the electrode of the immediately contiguous transducer by a distance of at most 0.5 mm.

This embodiment of the chip furthermore has the following advantage:
  the use of a multitude of small-sized transducers very close to one another enables the detection of a fingerprint.

Finally, an object of the invention is also a collective method of fabrication of several electronic chips each comprising at least the above transducer and a circuit for reading these transducers, this method comprising:
  the deposition and etching on a substrate of the lower conductive electrode simultaneously for all the transducers of the different electronic chips fabricated on the same substrate,
  the deposition of at least one layer of pyroelectric material simultaneously for all the transducers of the different chips fabricated on the same substrate, the layer of pyroelectric material being made on a III-V nitride base;
  the deposition and/or etching of the upper conductive electrode simultaneously for all the transducers of the different chips fabricated on this same substrate so that the layer of pyroelectric material generates a difference in potentials between these electrodes in response to a temperature variation even when there is no external mechanical stress, and
  the cutting of the substrate to mechanically separate the different fabricated electronic chips.

The embodiments of the method of collective fabrication may have the following characteristics:
  the method comprises the oxidation of the upper face of the upper electrode pointed towards the side opposite the layer of pyroelectric material simultaneously for all the transducers of the different electronic chips fabricated on the same substrate.

BRIEF DESCRIPTION OF THE DRAWINGS

The invention will be understood more clearly from the following description given purely by way of a non-exhaustive example made with reference to the appended drawings of which.

In these figures, the same references are used to designate the same elements.

MORE DETAILED DESCRIPTION

Here below in this description, the characteristics and functions well known to those skilled in the art are not described in detail.

Figure 1:
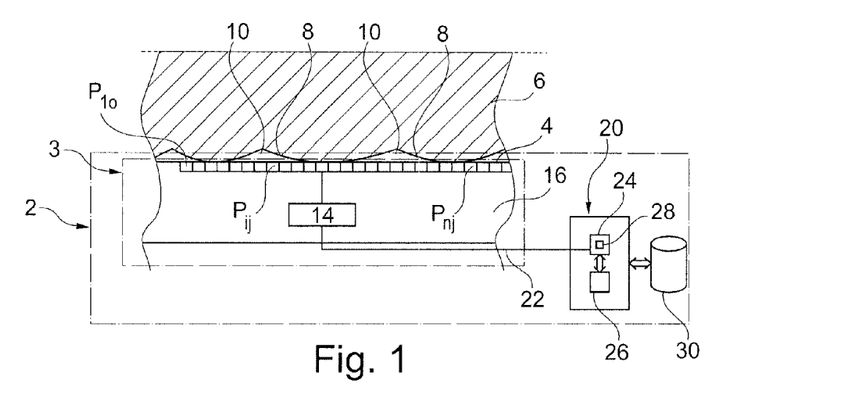
FIG. 1 is a schematic illustration of a heat pattern detector.

FIG. 1 shows a detector 2 of a heat pattern.

A heat pattern is a non-homogenous spatial distribution of the thermal characteristics of an object detectable by means of an electronic chip 3 of the detector 2. A heat pattern of this kind is generally carried by an object. In this embodiment, a fingerprint is a heat pattern detectable by means of the detector 2.

The term "thermal characteristic" designates the properties of an object that are a function of its thermal capacity and its thermal conductivity.

Here below in this description, the detector 2 is described in the particular case where it is especially adapted to the detection of a fingerprint. In this particular case, the detector 2 is better known as a fingerprint detector.

The chip 3 has a sensitive face 4 to which the object incorporating the heat pattern to be read must be applied. In this case the object is a finger 6, the epidermis of which is directly supported on the face 4. The fingerprint present on the epidermis of the finger 6 is expressed by the presence of ridges 8 separated by valleys 10. In FIG. 1, the finger 6 is magnified several times to make the ridges 8 and the valleys 10 visible.

When the finger 6 is resting on the face 4, only the ridges 8 are in direct contact with the face 4. On the contrary, the valleys 10 are isolated from the valleys 4 by air. Thus, the thermal conductivity between the finger and the face 4 is better on the ridges 8 than at the valleys 10. A fingerprint therefore corresponds to a heat pattern that can be read by the chip 3.

To this end, the chip 3 has a multitude of detection pixels $P_{ij}$ positioned immediately beside one another throughout the face 4. A detection pixel $P_{ij}$ is the smallest autonomous surface area capable of detecting a temperature variation. The temperature variations detected vary from one pixel to the other depending on whether it is in contact with a ridge 8 or facing a valley 10.

These pixels $P_{ij}$ are made on a same substrate 16.

Figure 2:
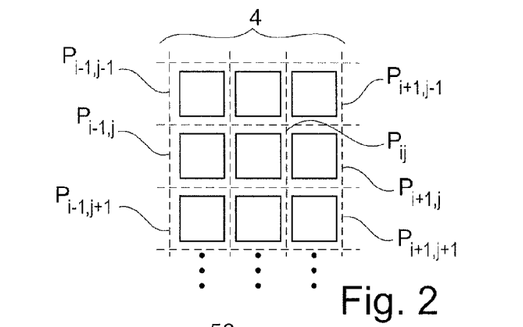
FIG. 2 is a schematic and partial illustration of the distribution of pixels of the detector of FIG. 1 on a sensitive face.

An example of distribution of the pixels $P_{ij}$ beside one another is shown in FIG. 2. In this example, the pixels $P_{ij}$ are distributed in rows and in columns to form a matrix of pixels. For example, the chip 3 has at least two or five rows of at least 100 or 150 pixels each.

Each pixel defines a fraction of the face 4. Here, these fractions on the face 4 are rectangular and demarcated by lines of dashes in FIG. 2. The surface of each fraction is smaller than 1 mm² and preferably smaller than 0.5 or 0.01 or 0.005 mm². Here, the fraction of the face 4 defined by each pixel $P_{ij}$ is a square with 50 µm side. The distance between the geometrical centers of two contiguous pixels is smaller than 1 mm and preferably smaller than 0.5 to 0.1 or 0.01 or 0.001 mm. Here, the distance between the centers of the contiguous pixels $P_{ij}$ is equal to 50 µm.

Each pixel comprises:
  a transducer capable of converting a temperature variation into a difference in potentials, and
  a heating resistor capable of heating the object in contact with this transducer.

The difference in potentials represents the "measurement" of the temperature variation in the sense that, after calibration, this difference in potentials can be directly converted into a temperature variation.

Figures 3, 4, 7:
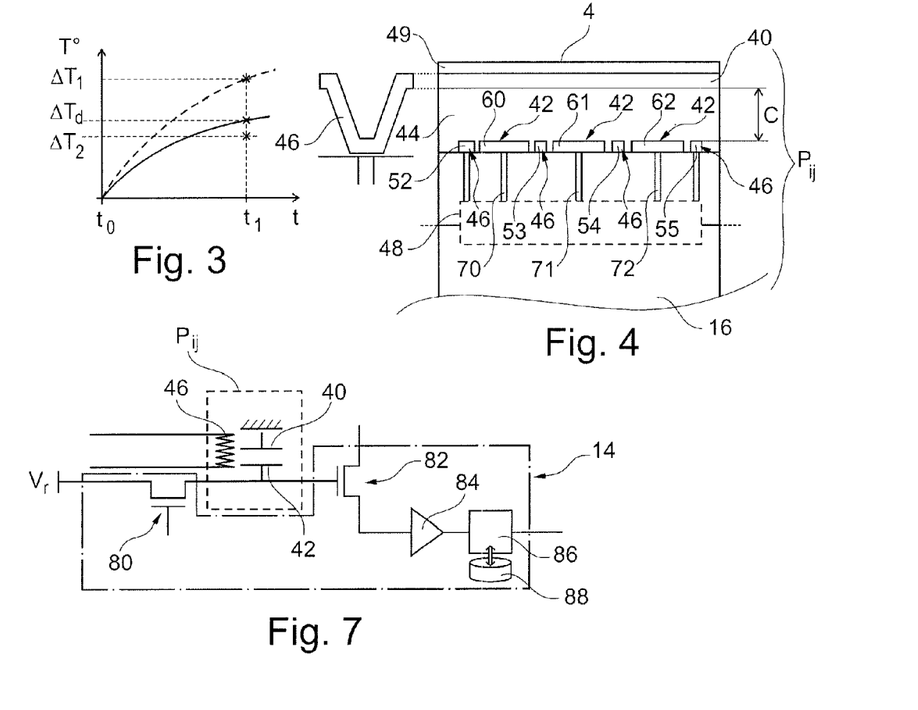
FIG. 3 is a graph illustrating a temperature variation measured by a transducer of the detector of FIG. 1 in two different situations.
FIG. 4 is a schematic illustration in cross-section of the structure of a normal transducer of the detector of FIG. 1
FIG. 7 is a schematic illustration of a read circuit for the transducers of the detector of FIG. 1.

This heating resistor makes it possible to implement an active method of detection such as the one described in the U.S. Pat. No. 6,091,037. The operating principle of this active detection method is recalled with reference to FIG. 3. In FIG. 3, the solid line represents the progress of the temperature of a transducer in direct contact with a ridge 8 of the finger 6. The dashed curve for its part represents the progress of the temperature of a transducer facing a valley 10. When the transducer is in direct contact with the ridge 8, the temperature dissipated by the heating resistor of this pixel is expressed by a slower elevation of the temperature since a part of this heat is directly transmitted to the finger 6. Conversely, when a transducer faces a valley 10, the thermal conductivity between this transducer and the finger 6 is lower and the heat produced by the resistance of the pixel leads to a faster rise in the temperature of this pixel. Thus, when the temperature variation between the instants $t_0$ and $t_1$ is read by the transducer, those directly in contact with a ridge 8 read a temperature variation $\Delta T_d$ that is lower than the variation $\Delta T1$ read by the pixels facing the valleys 10. This difference in temperature variation enables the detection of the presence of a valley or a ridge at a particular position on the face 4.

The active detection methods have several advantages, including especially the fact of being able to work even if the initial temperature of the pixels is close or identical to that of the object having the heat pattern. It is also possible to adjust the contrast by controlling the quantity of heat dissipated by the heating resistor of each pixel.

Each pixel $P_{ij}$ is electrically connected to a circuit 14 for reading the measurements of the temperature variation performed by each of these pixels. More specifically, the circuit 14 is capable of:
  selecting one or more pixels $P_{ij}$ to be read,
  controlling the heating resistor of the selected pixel or pixels, and
  reading the temperature variation measured by the transducer of the selected pixel or pixels.

Typically, the read circuit is etched and/or deposited in the same rigid substrate 16 as the one on which the pixels $P_{ij}$ are made. For example, the substrate 16 is made of silicon or glass.

The detector 2 also has an electronic computer 20 connected by a wire link 22 to the chip 3. For example, this computer 20 is equipped with a module 24 for driving the chip 3 and a processing module 26.

The module 24 enables the reading of the heat pattern through the measurements of the detection pixels. More specifically, this module is capable of preparing a map of the ridges and valleys detected by the different pixels as a function of the measurements of the pixels and of the known position of these pixels relatively to one another.

This module 24 is herein equipped with a sub-module 28 for calibrating the chip 2 whose operation is described with reference to the method of FIG. 9.

Here, the module 26 is capable of comparing the heat pattern read with a pre-recorded database of heat patterns to identify a particular heat pattern and, in response, to permit or on the contrary prohibit certain actions such as for example access to a building.

Alternately or as a complement, the module 26 is also capable of displaying the heat pattern read on a screen. This makes it possible for example to magnify the heat pattern read.

Typically, the computer 20 is made with at least one programmable electronic computer capable of executing the instructions recorded on an information-recording medium. To this end, the computer 20 is connected to a memory 30 containing the instructions and the data needed to execute the methods of FIGS. 9 and 11. In particular, the memory 30 contains values $\Delta T_{1ref}$, $\Delta T_{2ref}$ and $\Delta T_{cref}$ needed to calibrate the chip 3. These values are described further below with reference to FIG. 9.

The chip 3 has two types of pixels $P_{ij}$: "normal" pixels denoted as $P_{nij}$, and calibration pixels denoted as $P_{cij}$. The pixels $P_{nij}$ are qualified as "normal" pixels because they are the majority of the pixels (for example more than 90% of the pixels $P_{ij}$) of the chip 3. There are all identical to one another. The term "identical" designates the fact that they have the same thermal characteristics and that they are all obtained by the same fabrication method. FIG. 4 represents a particular example of an embodiment of a normal pixel $P_{nij}$ of the chip 3.

The pixel $P_{nij}$ comprises an upper electrode 40 and a lower electrode 42 between which there is interposed a layer 44 made of pyroelectric material.

Here, the electrode 40 is common to all the pixels of the chip 3. This electrode 40 is ground-connected by means of a ground pad 46. The electrode 40 is the one that is interposed between the finger 6 and the layer 44 when this finger is applied to the face 4. It is therefore made so as to efficiently and swiftly conduct heat to the layer 44. Here, it is made out of a material that is a good heat conductor, i.e. a material having thermal conductivity of over 10 W·m$^{-1}$·K$^{-1}$. It also has a small thickness, i.e. a thickness of less than 100 μm and preferably less than 1 μm. Here, the upper electrode is made of molybdenum (Mo).

In this embodiment, the layer 44 is made of aluminum nitride. Here, the "made of" refers to a layer made almost exclusively of the same material. Thus, aluminum nitride amounts to more than 90% and preferably more than 95% by mass of the layer 44. The layer 44 is also common to all the pixels of the chip 3. The thickness of the layer 44 is more than 0.5 or 0.6 μm and advantageously greater than 1 μm. Indeed, the greater the thickness of the layer, the greater the charges generated in the material. Here, its thickness is of the order of 2 to 3 μm. This layer converts a temperature variation into a difference in potentials between the electrodes 40 and 42.

The lower electrode 42 is specific to each pixel and electrically insulated from the lower electrodes of the other pixels. It enables a reading of the potential difference generated by the layer 44 at the pixel $P_{ij}$. For example, this lower electrode is made of molybdenum and its thickness is 50 nm.

The pixel $P_{nij}$ also comprises a heating resistor 46 formed in the same layer as the one used to form the electrode 42. This heating resistor is used to heat the layer 44 to implement the active detection method.

The electrode 42 and the resistor 46 are connected to the circuit 14 by means of conductive tracks 48 symbolized by a rectangle of dashes.

The pixel $P_{nij}$ also has a protective layer 49 deposited on the upper electrode 40 so as to further protect it against abrasion and chemical corrosion as well as oxidation. This protective layer is made of a material that is a good conductor of heat. It also has a small thickness. For example, the thickness of the layer 49 is strictly smaller than 100 μm and preferably smaller than 10 μm. For example, the protective layer is a layer of aluminum nitride (AlN) with a thickness of some micrometers.

Figure 5:
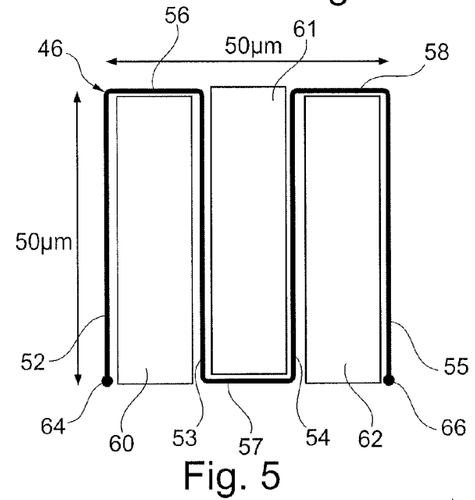
FIG. 5 is a schematic illustration in a top view of the structure of a lower electrode of the transducer of FIG. 4.

FIG. 5 shows a particular arrangement of the resistor 46 made so that it has resistance of more than 1 KΩ while at the same time occupying less than 15% of the surface of the pixel $P_{nij}$. Here, the resistor 46 is made of molybdenum since it is obtained by the etching of the same layer as the one used to make the lower electrode 42. The resistor 46 is a resistive band shaped as a meander. More specifically, the resistive band is formed by several primary strands 52 to 55 which extend in parallel with one another. These strands are series-connected. For this purpose, the ends of the strands 52 to 55 are connected to one another by secondary strands 56 to 58 which extend perpendicularly to the primary strands. Here, the resistor 46 cuts the lower electrode 42 into three identical rectangular plates 60 to 62. Each plate 60 to 62 has a length for example of 49 μm by 15 μm wide. The resistive band is spaced out by 0.5 μm from the different plates 60 to 62 so as to be electrically insulated from these plates. The width of the resistive band is 0.5 μm and its total length 250 μm. Since the thickness of the resistive band is the same as that of the lower electrode, i.e. 50 nm, the resistance of this resistive band between its two ends 64 and 66 is about 1 KΩ when it is made out of molybdenum with a resistance of 10 μΩcm. With a conformation of this kind, the resistor 46 takes up less than 12% of the surface area of the pixel $P_{nij}$.

The plates 60 to 62 are short-circuited with respect to one another by means of vertical pins 70 to 72 (FIG. 4).

The ends 64 and 66 of the resistor 46 are also connected by means of vertical pins to the tracks 48.

In order to facilitate its calibration, the chip 3 also has at least one calibration pixel $P_{cij}$ whose thermal characteristics are different from those of the normal pixels $P_{nij}$.

Figure 6:
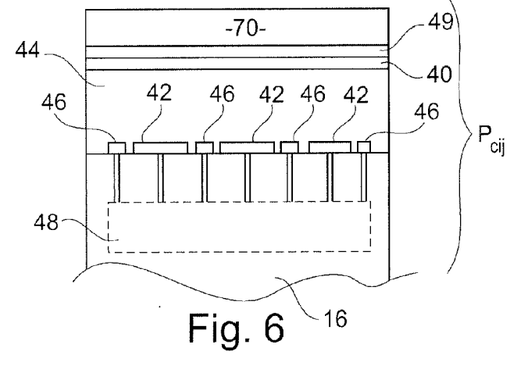
FIG. 6 is a schematic illustration seen in vertical section of a calibration transducer of the detector of FIG. 1.

FIG. 6 shows an exemplary embodiment of a pixel $P_{cij}$ of this kind. The pixel $P_{cij}$ is identical to the pixel $P_{nij}$ except that, above the protective layer 49, an additional layer 70 has been deposited. Because of this layer 70, the thermal capacity and/or the thermal conductivity of the pixel $P_{cij}$ is or are different from those of the pixel $P_{nij}$. Thus, under the same conditions, the temperature variation measured at the instant $t_1$ after the heating resistor 46 has been powered is different from the one measured by the pixels $P_{ij}$.

FIG. 7 shows an exemplary embodiment of the read circuit 14. In this figure, a pixel $P_{ij}$ to be read is symbolically represented in the form of a capacitor having its electrode 40 grounded and its electrode 42 connected to the circuit 14.

The circuit 14 has a set of transistors for resetting the potential of the electrode 42 of any one of the pixels of the chip 3. To simplify FIG. 7, only one transistor 18 of this set is shown. This transistor electrically connects the electrode 42 to an initial potential $V_r$ when it is conductive and alternately lets the potential of the electrode 42 float when this transistor 80 is not conductive. When the potential of the electrode 42 is floating, the difference in potentials $\Delta V_p$ between the electrodes 40 and 42 is a function of the temperature variation $\Delta T$. For example, the relationship between the difference in potentials $\Delta V_p$ and the temperature variation $\Delta T$ is modeled by the following relationship: $\Delta V_p = \gamma e \Delta T / \in_0 \in_r$, where:

e is the thickness of the layer 44, $\gamma$ is the pyroelectric coefficient of the material used to make the curve 44

$\in_0$ and $\in_r$ are respectively the absolute permittivity of the vacuum and the relative permittivity of the pyroelectric material.

The circuit 14 also has a set of transistors enabling the selection of any particular one of the pixels $P_{ij}$ of the chip 3 when it is conductive. To simplify FIG. 7, only one transistor 82 of this set has been shown. When the transistor 82 is conductive, it electrically connects the electrode 42 to an amplifier 84 of the difference in potentials $\Delta V_p$ of the selected pixel.

The circuit 14 also has an analog/digital converter 86 capable of sampling the analog signal amplified at output of the amplifier 84 to transmit it to the computer 20. This converter 86 is connected to a volatile memory containing the bounds $B_{min}$ and $B_{max}$ defining the voltage range to be sampled by the converter 86.

In order to obtain maximum sensitivity, the bound $B_{min}$ must ideally correspond to the temperature variation $\Delta T_d$ obtained when the pixel $P_{nij}$ is in direct contact with the ridge 8 having the best possible thermal conductivity. Similarly, ideally, the bound $B_{max}$ must correspond to the temperature variation $\Delta T1$ measured by the pixel $P_{nij}$ when it is in contact only with air.

These bounds $B_{min}$ and $B_{max}$ depend on the thermal characteristics of the pixel $P_{nij}$ but above all on the electrical characteristics of the different electronic components of the circuit 14. Indeed, the characteristic dimensions of the pixel are very appreciably greater than 1 micrometer and of the order of more than about 10 micrometers. Consequently, a slight imprecision of at least 1 micrometer during the fabrication of this transducer has little effect on the thermal characteristics of the pixel. The repeatability and the reproducibility of the thermal characteristics of the pixels is high.

Conversely, the electronic components of the circuit 14 such as the transistors 80 and 82 have characteristic dimensions very appreciably smaller than 1 micrometer. Thus, the same imprecision of less than 1 micrometer during the fabrication of one of the components leads to a very different operation. Consequently, the repeatability and the reproducibility of the electrical characteristics of the circuit 14 are far poorer. Thus, the thermal characteristics of the pixels from one chip to another may be deemed to be appreciably constant if the same manufacturing method is used. On the contrary, the electrical characteristics have far greater variability from one chip to another even if the same fabrication method is used.

Figure 8:
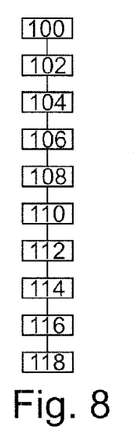
FIG. 8 is a flowchart of a method for fabricating transducers of the detector of FIG. 1.

The method of collective fabrication of the chip 3 shall now be described in greater detail with reference to FIG. 8. This method is "collective" in the sense that several chips are fabricated simultaneously on the same substrate.

Initially, in a step 100, the circuits 14 and the different tracks 48 of the different chips to be fabricated are etched on the same substrate 16.

Then, a step 102 is performed to make the vertical pins such as the pins 70 to 72 to connect the lower electrodes and the ends 64 and 66 of the heating resistors to the tracks 48.

Then, in a step 104, a layer of molybdenum is uniformly deposited on the entire substrate so that it comes into electrical contact with the different vertical pins made earlier.

At a step 106, this molybdenum layer is etched, for example by photolithography, to form the different lower electrodes of each transducers of each chip in one and the same operation and, at the same time, the resistor 46 of each of the pixels of the different chips.

Then, in a step 108, the aluminum nitride layer 44 is deposited on the entire substrate so as to form the layer of pyroelectric material of each of the transducer of each of the chips in one and the same operation.

In a step 110, this layer of aluminum nitride is etched for example by photolithography, to form the pads 46 for the ground-connection of the upper electrode.

At a step 112, a molybdenum layer is deposited on the entire substrate to form the upper electrode common to all the transducers of each chip.

At a step 114, the upper electrode is oxidized to a predetermined depth so as to obtain the desired color. The color obtained depends on the depth of oxidation. This oxidation may be done uniformly on the entire upper face of the upper electrode or selectively on a few parts only of this upper face so as to draw a logo for example.

Here, the upper electrode is oxidized on only a fraction of its thickness to preserve the thermal and electrical properties of molybdenum to the maximum extent.

Then, during a step 116, the protective layer 49 is deposited on the entire substrate.

The additional layer 70 of the pixels $P_{cij}$ is also made during the step 116. For example, an excess thickness of the same material as the one used for the layer 49 is made only above the pixels $P_{cij}$.

Finally, at a step 118, the substrate is cut so as to mechanically separate the different electronic chips made on this substrate from one another.

Once made, the electronic chip is implemented in a heat pattern detector such as the detector 2. However, before it can be used, in order to maximize its sensitivity, this chip is calibrated.

A method for calibrating these electronic chips shall now be described with reference to the method of FIG. 9.

Figure 9:
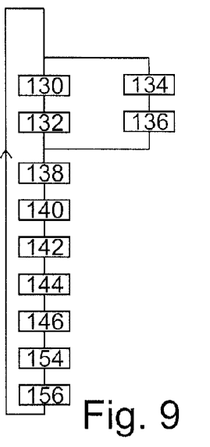
FIG. 9 is a flowchart of a method for calibrating transducers of FIG. 1.

In the method of FIG. 9, measurements are first of all made on a reference electronic chip and then used to calibrate an electronic chip. Here, the reference chip comprises the same transducers as those of the chip to be calibrated. For example, the reference chip is identical to the chip to be calibrated, i.e. they are obtained by the same fabrication method. Although the same fabrication method has been used, it may be that the read circuits 14 of these chips do not have exactly the same electrical characteristics because of imprecision of fabrication.

Initially, at a step 130, at least one of the pixels $P_{nij}$ of the reference chip is placed in direct contact with a first element having first thermal characteristics. Here, this first element is chosen to correspond to the element having the poorest thermal conductivity likely to be encountered during the use of the detector 2. For example, in this case the first element is ambient air.

Then, at a step 132, the temperature variation $\Delta T_{1ref}$ measured by this pixel $P_{nij}$ is read by the circuit 14 of the reference chip. The method for reading a temperature variation $\Delta T$ by means of a pixel is described in greater detail with reference to FIG. 11.

At the same time, at a step 134, the pixel $P_{cij}$ of the reference chip is also put into contact with the same first element, i.e. air. At a step 136, the circuit 14 then measures the corresponding temperature variation $\Delta T_{cref}$.

Then, during the step 132 and 134, the measurements are made with ambient air and the term "contactless" measurement is used.

Then, at a step 138, at least one of the pixels $P_{nij}$ of the reference chip is put into contact with a second element having thermal characteristics different from those of the first element. Here, this second element is chosen to correspond to the element having the best thermal conductivity liable to be encountered during a normal use of the detector 2. Since the skin and the epidermis are essentially constituted by water, the second element is herein approximated by water.

At a step 140, the circuit 14 of the reference chip is used to read the temperature variation $\Delta T_{2ref}$ measured by this pixel $P_{cij}$.

At a step 142, the temperature variations $\Delta T_{1ref}$, $\Delta T_{cref}$ and $\Delta T_{2ref}$ are recorded in the memory 30 of every detector using a chip fabricated by the same fabrication method as that of the reference chip. For example, these variations are recorded in the code of the calibration sub-module 28.

Figure 10:
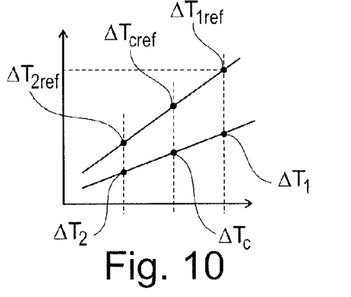
FIG. 10 is a graph illustrating the measurements made during the implementation of the method of FIG. 9.

Generally, the variation $\Delta T_{cref}$ corresponds to the temperature variation which would be measured if the pixel $P_{nij}$ were to be put into contact with an object for which the thermal characteristics are situated between those of the first and second elements. The variations $\Delta T_{1ref}$, $\Delta T_{cref}$ and $\Delta T_{2ref}$ measured during the step 130 to 140 with the reference chip can therefore be represented on the same graph (FIG. 10) as a function of the thermal characteristics of the object put into contact with the pixel $P_{nij}$. Here, it is assumed that the temperature variations measured vary linearly as a function of the thermal characteristics of the object.

During a second phase, the chip to be calibrated is calibrated by using the variations $\Delta T_{1ref}$, $\Delta T_{cref}$ and $\Delta T_{2ref}$ recorded in the memory 30 of the detector 2 incorporating this chip.

More specifically, at a step 144, at least one of the pixels $P_{nij}$ and the pixel $P_{cij}$ of the second chip are put into contact with the same first element, i.e. air, as was done at the step 130.

At a step 146, the circuit 14 of the chip to be calibrated reads the temperature variations $\Delta T1$ and $\Delta T_c$ measured respectively by the pixels $P_{nij}$ and $P_{cij}$. A contactless measurement is then made during the step 146.

Then, at a step 154, the temperature variation $\Delta T2$ that would be measured by the pixel $P_{nij}$ of the chip to be calibrated, if it were to put into contact with the second element, i.e. water, is determined without this pixel being really placed into contact with water. More specifically, the variation $\Delta T_2$ is determined from a predetermined relationship which links it to the measured variations $\Delta T_1$ and $\Delta T_c$. This relationship is determined from the variations $\Delta T_{1ref}$, $\Delta T_{2ref}$ and $\Delta T_{cref}$.

To simplify the explanations, it is assumed here that the measured variations $\Delta T$ vary linearly as a function of the thermal characteristics of the object applied to the face 4. There is therefore a ratio α of proportionality between, for example, the differences $\Delta T_{2ref} - \Delta T_{1ref}$ and $\Delta T_{1ref} - \Delta T_{cref}$. It is assumed that this ratio α is kept from one chip to another. This assumption is reasonable because the thermal characteristics of the pixels are more stable from one chip to another than are the electrical characteristics of the circuit 14. Thus, the predetermined relationship linking the variation $\Delta T_2$ to the measured variations $\Delta T_1$ and $\Delta T_c$ is for example the following:

$$\Delta T2 = \Delta T1 - (\Delta T_{2ref} - \Delta T_{1ref})(\Delta T_1 - \Delta T_c)/(\Delta T_{1ref} - \Delta T_{cref})$$

At a step 156, the sub-module 28 uses the variations $\Delta T1$ and $\Delta T2$ to set the chip, i.e. to determine at least one parameter for setting the chip. Each parameter for setting the chip modifies the working or the performance of the chip when it is modified. Here, the setting consists in adjusting the sensitivity of the circuit 14. More specifically, the setting parameters are two bounds $B_{min}$ and $B_{max}$ of the converter 86. These bounds are computed from the variations $\Delta T1$ and $\Delta T2$ to maximize the sensitivity of the circuit 14. For example, the bound $B_{min}$ corresponds to the variation $\Delta T2$ and the bound $B_{max}$ corresponds to the variation $\Delta T1$. This computation is done for example by the sub-module 28. Then the values of the bounds $B_{min}$ and $B_{max}$ are recorded in the memory 88.

The steps 154 and 156 form a phase of calibration of the electronic chip. This calibration phase is routinely activated each time that the chip is powered on followed by a use of the chip to read a heat pattern.

Preferably, the method of calibration is executed by the sub-module 28 at each time that the electronic chip 3 is powered on. Thus, it is not necessary to store the variations $\Delta T_{1ref}$, $\Delta T_{2ref}$ and $\Delta T_{cref}$ or the ratio α on the electronic chip 3 itself.

Figure 11:
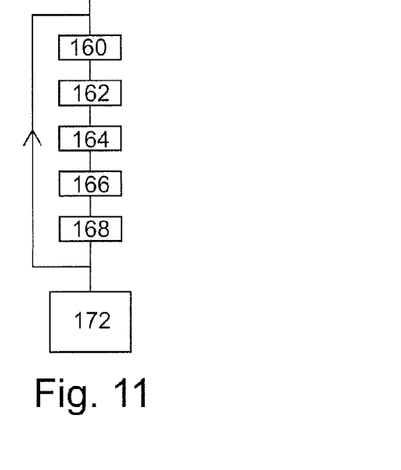
FIG. 11 is a flowchart of a method of operation of the detector of FIG. 1.

The working of the detector 2 and more specifically of the circuit 14 shall now be described with reference to the method of FIG. 11.

To read a heat pattern, the measurements of each pixel $P_{nij}$ of the chip 3 are acquired. To this end, initially, at a step 160, the transistor 80 is controlled to connect the electrode 42 to the resetting potential $V_r$. Typically, the resetting potential is low if the temperature variation leads to increasing the voltage and on the contrary it is high if the temperature variation to be measured leads to diminishing this voltage.

Then, at a step 162, the circuit 14 causes a current to flow in the heating resistor 46 to heat the pixel $P_{nij}$. As the case may be, at the step 162, the circuit 14 also activates the passage of a current between the terminals of the heating resistors of all the pixels immediately adjacent to the pixels used to make the measurement. This increases the calorific power delivered.

Then, at a step 164, the transistor 80 is controlled to become non-conducting. The voltage at the electrode 42 is therefore floating and, from this instant onwards, it follows the temperature variation. The opening of the transistor 80 is applied solely after the heating resistor 46 is powered on so that the disturbances related to the turning on of the heating resistor have no effect on the subsequent working of the pixel $P_{nij}$.

At a step 166, the transistor 82 is controlled to select the pixel $P_{nij}$. Starting from this point in time, the electrode 42 is electrically connected to the amplifier 84 and then to the analog/digital converter 86. The difference in potentials between the electrodes 40 and 42 is then sampled and then transmitted to the computer 20.

Finally, in a step 168, after reading of the difference in potentials between the electrodes 40 and 42, the heating resistor 46 is stopped.

The steps 160 to 168 are repeated for all the pixels $P_{nij}$ of the chip 3. This iteration for all the pixels of the chip enables the preparation of a map of the heat pattern. Typically, more than 100 or 1000 maps are prepared per second.

During a step 172, the different maps prepared are processed by the unit 26 to reveal the heat pattern and, in response, to trigger certain actions.

Many other embodiments are possible. For example, the upper electrodes or lower electrodes may be made out of other materials such as tungsten or titanium.

The upper electrode is not necessarily common to all the pixels.

The protective layer may be omitted or may be made out of materials other than aluminum nitride. When the protective layer is omitted, the object carrying the heat pattern to be detected is directly supported on the upper electrode. When the protective layer is made out of another material, it may be made with silicon nitride.

The layer of pyroelectric material is not necessarily made solely out of aluminum nitride. Indeed, the layer of pyroelectric material may be a mixture of aluminum nitride or one of several other materials that do not hamper the circulation of charges between the electrodes. The proportion of aluminum nitride in this mixture is then at least 10, 25, 50 or 75% by mass. The other materials may or may not themselves be pyroelectric materials.

In all the embodiments described here, aluminum nitride may be replaced by one or more nitrides chosen from the group formed by III-V nitrides. In particular, the layer of pyroelectric material may be based on a nitride or a mixture of nitrides chosen from the group formed by aluminum nitride, gallium nitride and indium nitride.

Other layers may be introduced, in addition to the pyroelectric layer based on III-V nitride, between the lower and upper electrodes. In order that the transducer may function, this additional layer or each of these additional layers is made of a material that does not hamper the flow of charges between these electrodes. This or these additional layers may be made out of other pyroelectric materials. For example, between the electrodes, at least one layer of aluminum nitride is stacked on or beneath another layer of LZT (lead zirconate titanate) or carbon.

The heating resistor may be formed in the same layer as the one etched to form the upper electrode.

The resistivity of the resistor 46 may be increased by reducing the thickness of the resistive band.

In other embodiments, the heating resistor may be common to several pixels. In this case, for example, the resistive band crosses several pixels before meeting its ends 64 and 66.

In another embodiment, the heating resistor does not separate the electrode into several plates. For example, the heating resistor may be shaped to extend along the external periphery of the electrode. For example, the heating resistor extends along more than 80% of the periphery of this electrode.

The heating resistor may also be buried beneath the lower electrode and not necessarily made at the same level as this electrode.

The calibration sub-module 28 may be implanted in the electronic chip. Preferably, it is then implemented in hardware form in the substrate 16.

The values of the variations $\Delta T1$ and $\Delta T2$ may also be used by applications other than the setting of the sensitivity of the analog/digital converter. Any step for using the variation $\Delta T2$ determined without setting up contact with the second element is herein considered to be a calibration step. For example, these variations $\Delta T1$ and $\Delta T2$ are used to set an analog amplifier which amplifies the measured signal only if it is contained between bounds $B_{minA}$ and $B_{maxA}$. For example, the bound $B_{minA}$ is set as a function of the variation $\Delta T1$ and the gain of the amplifier is set as a function of the variations $\Delta T1$ and $\Delta T2$.

Several calibration pixels $P_{cij}$ may be used. These calibration pixels do not necessarily have the same thermal characteristics. In particular, if the relationship between $\Delta T_c$, $\Delta T1$ and $\Delta T2$ is not linear, then several calibration pixels having different thermal characteristics are used to determine $\Delta T2$ without having to apply the second element to the chip.

If several calibration pixels having different thermal characteristics are used, it is also not necessary to make a contactless measurement of the difference in potentials for a normal pixel $P_{nij}$ to determine $\Delta T1$. For example, if the relationship between the temperature variations and the variations of the thermal characteristic of the object is linear, then two calibration pixels with different thermal characteristics are sufficient to determine $\Delta T2$ without any measurement being made with a normal pixel $P_{nij}$.

The roles of the normal pixels $P_{nij}$ and calibration pixels $P_{cij}$ can be inverted in the calibration method described here above.

It is also possible to provide for a calibration pixel for which the thermal characteristic is modified so as to measure a corresponding temperature variation in contact with the second element when it is in contact with the first element. For example, the additional layer 70 is replaced by a capsule containing water.

Other embodiments of the calibration pixel $P_{cij}$ are possible. For example, a large metal mass is positioned in proximity to the heating resistor to act as a heat sink and prevent this pixel from getting heated too quickly.

In another embodiment, the heating resistor of the pixel $P_{cij}$ is diminished as compared with that of a normal pixel.

The read circuit of the transducers is not necessarily common to all the pixels of the heat pattern detector. For example, as a variant, a first read circuit is provided for the reading of the normal pixels and a second read circuit is provided for the reading of the calibration pixels.

The use of a layer based on III-V nitride and especially based on aluminum nitride as a pyroelectric material can be applied both to passive detection pixels and to active detection pixels. The passive detection pixels are pixels devoid of any heating resistor. Thus, the pixel does not heat the object to reveal the heat pattern but only exploits the temperature of the object.

The object in contact with the sensitive face may be immobile or, on the contrary, it may move on this sensitive face. For example, the finger may sweep across the sensitive face. A sweeping motion of this kind enables a reading of a temperature pattern which extends on a surface that is strictly greater than the surface area of the sensitive face. A method of this kind is described in the U.S. Pat. No. 6,289,114.

One and the same electronic chip may comprise one or more matrices of pixels and one or more read circuits etched or deposited on the substrate of this chip.

Many other applications of the detector 2 are possible. In particular, the detector 2 is used to detect the heat pattern not only of a fingerprint but also of any other object having a heat pattern such as a bank note or a fabric.

For example, it is not necessary in all the applications that there should be direct contact between the sensitive face and the object. Thus, the electronic chip described here can also be used as a heat camera.

Nor is it necessary for the object to have ridges and valleys to present a heat pattern. In fact, the surface of the object may be uniformly flat. In this case, the heat pattern corresponds to local differences of thermal characteristics detectable by the pixels of the chip. For example, the object may be a finger whose fingerprint is entirely worn out. Indeed, even in this case where the epidermis no longer has any ridges and valleys, this epidermis still has local differences of characteristics that can be detected by the electronic chip as explained in the patent application EP 0 825 831.

The oxidation of the upper face of the upper electrode can be implemented independently of the other characteristics of the detection pixel described here above. For example, the oxidized upper electrode can be implemented with layers of pyroelectric material other than those made of aluminum nitride or III-V nitride.

Similarly, the different embodiments of the heating resistor described here can be implemented independently of the other characteristics of the transducer. For example, the making of the heating resistor by a resistive band which divides the electrode into several plates can be implemented independently of the other characteristics of the detection pixel described here above. In particular, this shaping of the electrode may be implemented whatever the pyroelectric material used.

Finally, the different characteristics of the detector needed to implement the calibration method described here can be implemented independently of the other characteristics of this detector and in particular independently of the pyroelectric material used.

The invention claimed is:

1. A transducer for transducing time-related temperature variations into a difference in potentials, the transducer comprising: an upper conductive electrode designed to be exposed to a time-related temperature variation to be measured, a lower conductive electrode, at least one layer of pyroelectric material directly interposed between the upper and lower conductive electrodes to generate, between the upper and lower conductive electrodes, a difference in potentials corresponding to the temperature variation even in the absence of external mechanical stress, wherein the pyroelectric material is based on a III-V nitride.

2. The transducer of claim 1, wherein the pyroelectric material is based on aluminum nitride.

3. The transducer of claim 1, wherein the upper electrode comprises molybdenum.

4. The transducer of claim 1, wherein the upper electrode is made of a conductive metal of which only an upper face opposite a face in contact with the layer made of pyroelectric material is oxidized.

5. The transducer of claim 1, further comprising a substrate on which at least a lower layer, the pyroelectric layer and then the upper electrode are stacked.

6. The transducer of claim 1, wherein the thickness of the layer of pyroelectric material is greater than 0.5 µm.

7. An electronic chip for the detection of heat patterns, the chip comprising: at least one transducer as recited in claim 1, to transduce time-related temperature variations into a difference in potentials, at least one resistor taking the form of a resistive band etched in a layer that is the same as the layer of the lower electrode and/or upper electrode of the transducer for heating the pyroelectric layer of the transducer when it is crossed by a current, the resistive band going through the electrode so as to divide the electrode into at least two separate plates, and electrical pins used to electrically short-circuit the separated plates above/below the plane of the layer in which the resistive band is formed.

8. The electronic chip of claim 7, wherein: the chip comprises a network of transducers arranged beside one another to form a sensitive face on which an object having a heat pattern to be detected can rest, and wherein the upper or lower electrode of each transducer has a surface area of at most 0.5 mm$^2$, and wherein the center of an electrode is separated from the center of an electrode of an immediately contiguous transducer by a distance of at most 0.5 mm.

9. A method for fabricating, on a single substrate, electronic chips, each comprising at least one transducer according to claim 1, and a circuit for reading the transducers, the method comprising: depositing and etching the lower conductive electrode on the substrate simultaneously for all the transducers of the different electronic chips to be fabricated on the substrate, depositing at least one layer of pyroelectric material based on III-V nitride simultaneously for all the transducers of the different chips to be fabricated on the substrate; and cutting the substrate to mechanically separate the different fabricated electronic chips, wherein the simultaneous deposition and/or etching of the upper conductive electrode simultaneously for all the transducers of the different chips fabricated on the same substrate causes the layer of pyroelectrical material to generate a difference in potentials between the electrodes in response to a temperature variation even in the absence of external mechanical stress.

10. The method of claim 9, further comprising oxidizing an upper face of the upper electrode facing a side opposite the layer of pyroelectric material simultaneously for all the transducers of the different electronic chips fabricated on the same substrate.

11. The transducer of claim 1, wherein the thickness of the layer of pyroelectric material is greater than 0.6 µm.

12. The transducer of claim 1, wherein the thickness of the layer of pyroelectric material is greater than 1 µm.

13. The transducer of claim 1, wherein the upper electrode comprises titanium.

* * * * *